United States Patent
Inoue

(10) Patent No.: US 6,886,600 B2
(45) Date of Patent: May 3, 2005

(54) PIPING DEVICE AND CUTTING OIL COATER USING THE SAME

(75) Inventor: Tsutomu Inoue, Nagoya (JP)

(73) Assignee: Fuji BC Engineering Co., Ltd., Aichi (JP)

( * ) Notice: Subject to any disclaimer, the term of this patent is extended or adjusted under 35 U.S.C. 154(b) by 1 day.

(21) Appl. No.: 10/359,528

(22) Filed: Feb. 5, 2003

(65) Prior Publication Data

US 2003/0155030 A1 Aug. 21, 2003

(30) Foreign Application Priority Data

Feb. 7, 2002 (JP) ........................................ 2002-031292

(51) Int. Cl.[7] ................................................. F15D 1/02
(52) U.S. Cl. ............................. 138/42; 138/39; 138/40
(58) Field of Search ............................... 138/42, 40, 39

(56) References Cited

U.S. PATENT DOCUMENTS

| | | | | |
|---|---|---|---|---|
| 1,172,140 A | * | 2/1916 | Jenkins | 138/42 |
| 1,459,666 A | * | 6/1923 | Adams | 137/557 |
| 1,883,720 A | * | 10/1932 | Grimes | 138/41 |
| 1,942,598 A | * | 1/1934 | Hewgley | 166/91.1 |
| 2,146,256 A | * | 2/1939 | Gobel | 131/218 |
| 2,210,480 A | * | 8/1940 | Brice | 138/42 |
| 2,243,592 A | * | 5/1941 | Wolf | 315/59 |
| 2,353,161 A | * | 7/1944 | Heigis et al. | 441/41 |
| 5,813,652 A | * | 9/1998 | Richmond et al. | 251/127 |

* cited by examiner

*Primary Examiner*—Patrick Brinson
(74) *Attorney, Agent, or Firm*—Jordan and Hamburg LLP

(57) ABSTRACT

A piping device for use in a cutting oil coater includes an oil supply path, a narrower path connected with the oil supply path and having an inside diameter smaller than that of the oil supply path, an oil tube, for feeding liquid oil to the oil supply path, a gas tube for feeding a gas to the oil supply path, where it mixes with the oil and changes it into a droplet state, an air space into which the oil is discharged from the narrower path, and is changed into a spray, a wall defining the air space having a recess, and a plurality of branch paths into which the oil impinges on the recess flows, with a substantially even flow distribution in each branch path, wherein a vertex of the recess and an end of the narrower path face each other. The apparatus suppresses an uneven distribution of flow rate of oil discharged into the air space.

23 Claims, 7 Drawing Sheets

PIPING DEVICE AND CUTTING OIL COATER USING THE SAME

BACKGROUND OF THE INVENTION

1. Field of the Invention

The present invention relates generally to a piping device that diverts oil flow, and particularly relates to a piping device for use in a cutting oil coater for coating a cutting oil over cutting objects and tools in a cutting process.

2. Related Background Art

Conventionally, cutting is carried out while coating oil over a cutting object and a tool so as to improve the cutting accuracy and to extend the life of the tool. If the oil is coated in a droplet state, the cutting can be carried out with the use of a minute amount of the oil, thereby not only improving the processing accuracy and the productivity but also improving the working environment and allowing for the simplification of the factory facilities, etc.

In such cutting, oil may be discharged out of a plurality of outlets so that the operations of oil coating with respect to the cutting object and the tool corresponding to the outlets are performed simultaneously. This is effective in the case where the cutting is performed with respect to a plurality of portions of the object using a plurality of tools. Further, even in the case where one tool is used, the application of oil from a plurality of directions makes the cutting treatment uniform, improves the processing accuracy, and further, suppresses the abrasion of the tool.

FIG. 6 is a plan view illustrating an example of a conventional cutting oil coater. Three spray transport tubes 62a to 62c are connected to a piping device 60 via joints 61a to 61c. The spray transport tubes 62a to 62c are connected with spray generators 63a to 63c, respectively. The spray generators 63a to 63c produce an oil spray (fine particles of liquid oil) by mixing oil supplied from oil tanks 66a to 66c by oil pumps 65a to 65c with air supplied from air sources 64a to 64c, respectively.

The oil spray thus generated is transported to the piping device 60 by the spray transport tubes 62a to 62c. In the piping device 60, the oil spray passes through paths 67a to 67c, and is discharged via outlets 68a to 68c, respectively.

In this case, paths 69a to 69c inside the outlets have a small inside diameter relative to that of the paths 67a to 67c. Therefore, after the oil spray flows into the paths 69a to 69c inside the outlets, the flow velocity of the oil spray increases, thereby changing into a droplet state when being discharged. Thus, in the example shown in the drawing, the oil in the droplet state can be applied in three directions simultaneously to a rotating saw blade 70.

While the example in FIG. 6 is configured so as to be connected with spray generators for all the paths, it may be configured so as to be connected with oil pumps in place of the spray generators. In such a device, oil in a liquid state is transported through paths, and the liquid-state oil discharged from outlets 68a to 68c at ends of the paths is diffused, thereby changing into a droplet state.

FIG. 7 is a cross-sectional view illustrating another example of a conventional piping device. In a piping device 71 shown in the drawing, tubes 74a to 74c are connected to a diverting section 72 via joints 73a to 73c, respectively. Joint main bodies 75a to 75c are fastened to the diverting section 72 using screw threads 76a to 76c thereof, respectively. The tubes 74a to 74c are inserted through sleeves 77a to 77c as fixing members, respectively. Nuts 78a to 78c as fastening members are screwed against screw threads 79a to 79c of the joint main bodies 75a to 75c, respectively, so that the sleeves 77a to 77c are pressed tightly to the tubes 74a to 74c, respectively. Thus, the tubes 74a to 74c are fixed to the joint main bodies 75a to 75c by means of the sleeves 77a to 77c and the nuts 78a to 78c, respectively.

The oil spray supplied from the tube 74a flows into a path 80 inside the diverting section 72, and is diverted to a flow through a path 81 (indicated by an arrow h) and a flow through a path 82 (indicated by an arrow i). The oil spray thus diverted flows into the tubes 74b and 74c, and is discharged finally through outlets (not shown) having narrow diameters, while changing into a droplet state.

However, the foregoing conventional cutting oil coater as described above has the following problems. The device as shown in FIG. 6 has an advantage in that it is capable of making an oil amount coated over the object uniform since it is capable of controlling a flow rate of the oil spray as to each of the tubes 62a to 62c. However, in this case, it is necessary to connect the spray generators 63a to 63c or the oil pumps to all the tubes 62a to 62c, respectively, and this increases the production cost and the complexity of structure.

In the case where the piping device as shown in FIG. 7 is used, a plurality of spray generators are not needed and the device can be simplified. However, there is a drawback in that the flow rates in the paths 81 and 82 that are diverted in the diverting section 72 differ from each other.

More specifically, oil spray is supplied via a tube 74a, in which without a particular selecting means, oil in a droplet state or a liquid state also is transported along with the oil spray. This causes the distribution state of oil in the path 80 to vary, and a state may occur in which oil in a droplet state or a liquid state is distributed unevenly, for instance, residing on a wall on one side in the path 80. In the case where the oil is diverted in this state, the oil in the path 81 and the oil in the path 82 have different flow rates. Therefore, even if the inside diameters of the paths 81 and 82 are set to be equal to each other so that the flow rates at the outlets at the ends of the paths are substantially equal to each other, they differ from each other in some cases, and the relationship between the respective flow rates at the outlets varies with time, thereby becoming destabilized. In this case, it is impossible to make the cutting treatment uniform. This causes a drawback in that the cutting work involves increased variations.

It should be noted that states of oil are described distinctively, such as "spray", "a droplet state" and "a liquid state", depending on the diameter of oil particles. The "spray" indicates a fine particle state including a smoke state in which particles of oil are so fine as to drift in air, and comparing oil in the spray state, the droplet state, and the liquid state, the oil particle diameter increases in the stated order. To state reversely, the "droplet state" indicates a state in which oil in the liquid state is diffused, and the "spray" indicates a state in which the oil in the droplet state is diffused further so as to be in the fine particle state. Comparing oil in the spray state, the droplet state, and the liquid state, the tendency of gravitational falling and the adhesiveness to wall faces of oil increase in the stated order. These definitions apply to the descriptions below.

SUMMARY OF THE INVENTION

Therefore, with the foregoing in mind, it is an object of the present invention to provide a simply structured piping device capable of stabilizing the relationship between the flow rates of oil discharged from a plurality of outlets, and to provide a cutting oil coater employing the same.

To achieve the above described object, a piping device of the present invention includes an oil supply path, a narrower path connected with the oil supply path and having an inside diameter smaller than that of the oil supply path, an air space into which the oil is discharged from the narrower path, a wall defining the air space having a recess, and a plurality of branch paths into which the oil having impinged on the recess flows, wherein a vertex of the recess and an end of the narrower path face each other.

In the foregoing configuration of the piping device, when droplets are supplied to the oil supply path, the droplets are caused to pass through the narrower path, which makes it possible to suppress the uneven distribution of oil flow rates. Therefore, it also makes it possible to suppress the uneven distribution of the flow rate of oil discharged into the air space. Furthermore, since the vertex of the recess and the end of the narrower path face each other, the discharged flow in which the uneven distribution of the oil flow rate is suppressed can be diverted with respect to the vertex of the recess as the center of the diversion. Thus, it is possible to stabilize the relationship among flow rates of oil discharged from a plurality of outlets even with a simple configuration.

In the foregoing piping device, the recess preferably is in an axially symmetrical shape with respect to an axis passing through the vertex. The piping device configured as described above more surely stabilizes the relationship among the flow rates of oil discharged from the plurality of outlets.

Furthermore, the recess preferably is in a shape of a polygonal pyramid having the same number of inclined surfaces as the number of the branch paths. The piping device configured as described above more surely stabilizes the relationship among the flow rates of oil discharged from the plurality of outlets.

Furthermore, at least one of the plurality of branch paths preferably has an inside diameter different from an inside diameter of the other branch paths. The piping device configured as described above stabilizes the ratio among the flow rates of discharged flows at outlets, in the case where the flow rates of discharged flows at the outlets are set to a predetermined ratio by adjusting the inside diameters of the branch paths.

Furthermore, it is preferable that the narrower path is a through hole of a member formed separately from the oil supply path, and that the member is detachable and replaceable. In the piping device as described above, it is possible to vary the inside diameter of the through hole easily, and hence, to adjust the size of droplets and the flow velocity of the flow discharged from the through hole. Therefore, it is possible to adjust the state of the discharged flow according to the type of a processing object and the degree of the processing.

Furthermore, the plurality of branch paths preferably are arranged so that respective distances along the wall between adjacent inlets of the branch paths are substantially uniform. The piping device configured as described above makes the flow rates of oil diverted to the branch paths substantially uniform more surely.

Next, a cutting oil coater of the present invention employs any one of the above described piping devices. According to the cutting oil coater configured as described above, even a simple configuration makes it possible to stabilize the relationship among flow rates of oil discharged from a plurality of outlets, thereby making the cutting treatment uniform and reducing the processing variation.

DETAILED DESCRIPTION OF THE INVENTION

Embodiment 1

Figure 1:
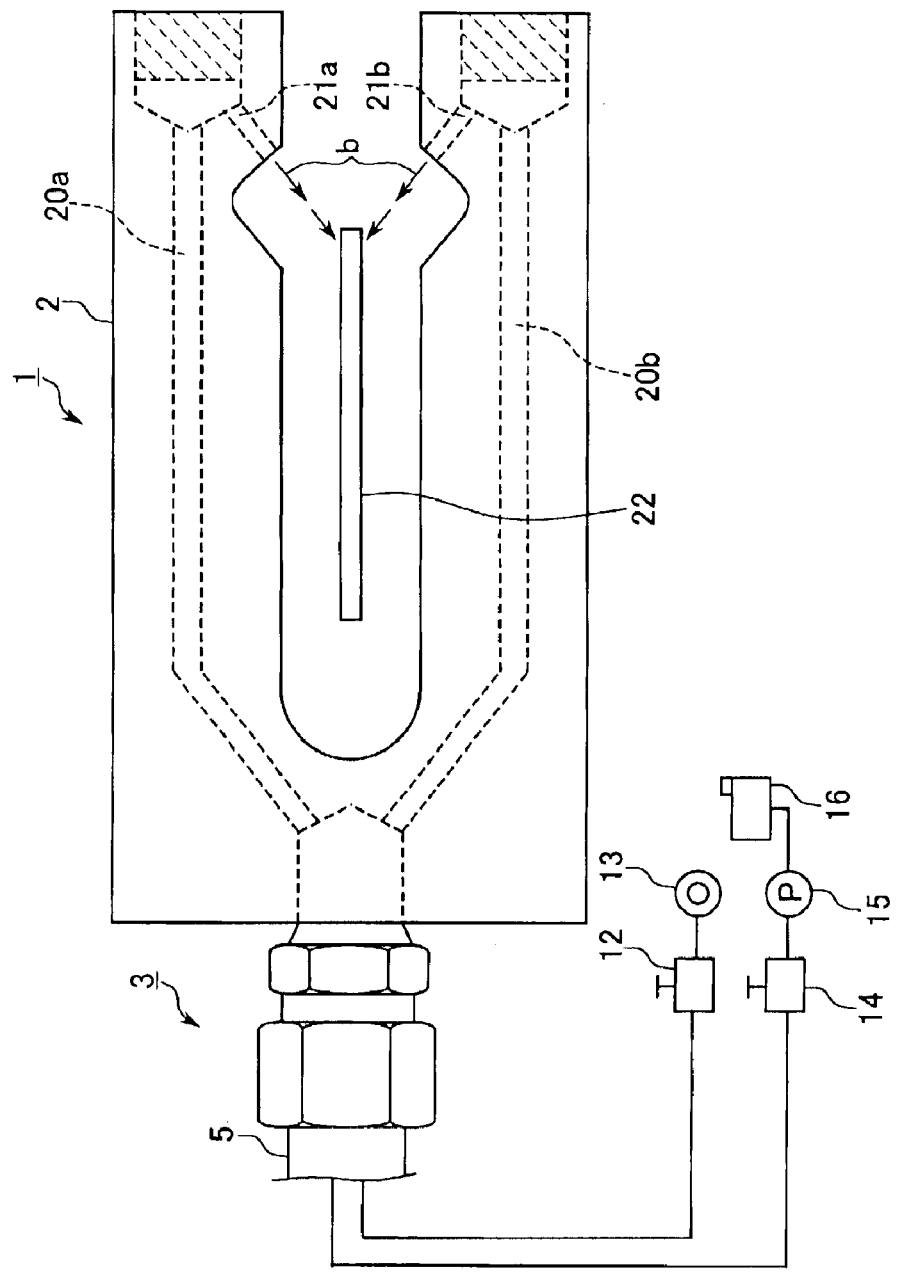
FIG. 1 is a view illustrating a configuration of a cutting oil coater according to Embodiment 1 of the present invention.
Figure 2A:
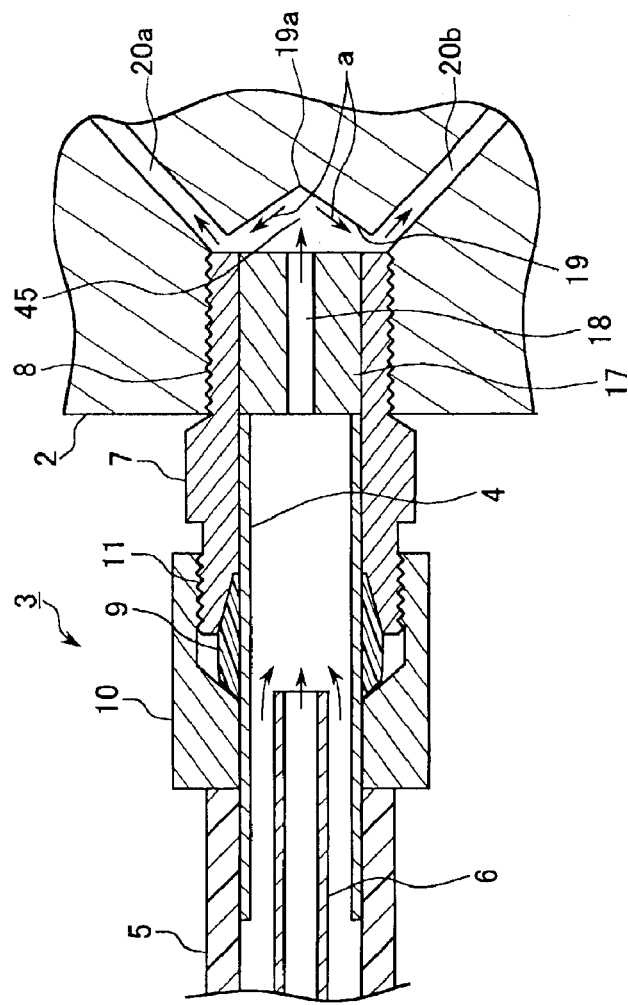
FIG. 2A is a cross-sectional view of a joint 3 shown in FIG. 1 taken in a horizontal direction.

The following will describe an embodiment of the present invention, while referring to the drawings. FIG. 1 is a view illustrating a configuration of a cutting oil coater according to Embodiment 1 of the present invention. The cutting oil coater shown in the drawing includes a piping device 1 having a diverting section 2 and a joint 3. FIG. 2A is a cross-sectional view of the joint 3 taken in a horizontal direction thereof (lengthwise direction thereof). A gas tube 5 is connected to the joint 3 via a pipe 4 serving as an oil supply path. In the gas tube 5, an oil tube 6 is inserted.

A joint main body 7 is fastened to the diverting section 2 via a screw thread 8 thereof. The pipe 4 is inserted through a sleeve 9 as a fixing member. A nut 10 as a fastening member is screwed firmly against a screw thread 11 of the joint main body 7 so that the sleeve 9 is pressed firmly to the pipe 4. Thus, the pipe 4 is fixed to the joint main body 7 via the sleeve 9 and the nut 10. This causes the gas tube 5 to be fixed to the diverting section 2 via the joint 3.

As shown in FIG. 1, the gas tube 5 is connected with a gas source 13 via the flow rate adjusting valve 12 as flow rate adjuster. With this configuration, gas such as air supplied from the gas source 13 is discharged from an end of the gas tube 5.

Furthermore, the oil tube 6 is connected with an oil pump 15 via a flow rate adjusting valve 14 as flow rate adjuster. The oil pump 15 is connected with an oil tank 16 as an oil reservoir. This allows oil in the oil tank 16 to be supplied to the oil tube 6 by the oil pump 15, thereby causing the oil to be discharged from an end of the oil tube 6. The gas discharged from the end of the gas tube 5, and the oil in a liquid state discharged from the end of the oil tube 6, are mixed inside the pipe 4, and the oil changes from the liquid state into a droplet state.

A collar 17 is inserted into the joint main body 7. In the example shown in the drawing, the collar 17 is configured by forming a through hole 18 as a path having a decreased diameter in a cylindrical member. The droplet-state oil generated in the pipe 4 flows into the through hole 18 in the collar 17. Since the through hole 18 has an inside diameter smaller than that of the pipe 4, the flow velocity of oil increases in the through hole 18. Thus, the oil having an increased flow velocity is discharged from the through hole 18 to an air space 45, thereby being diffused, while changing into an oil spray (fine particles of the liquid oil).

Here, as described above, the oil is changed into a droplet state in the pipe 4, in which the droplets of the oil have non-uniform sizes, and liquid-state oil is present therein also. Therefore, viewing a cross section of the pipe 4 in its diameter direction, the distribution of the oil flow rate is not stabilized, and the oil flow rate is distributed unevenly.

However, by causing such oil to flow into the through hole 18 having a decreased diameter, the oil is distributed evenly and densely as to the cross section of the through hole 18 in the diameter direction. When the oil is discharged in this state into the air space 45, the oil is diffused, thereby changing into oil spray. Therefore, viewing a cross section of the air space 45 in the foregoing diameter direction, the uneven distribution of the oil flow rate is suppressed.

Since an end of the through hole 18 and a vertex 19a of a diverting wall 19 face each other, the oil spray impinges intensively on the vicinity of the vertex 19a. The oil spray thus impinging on the wall is diffused along the inclined surface in a substantially conical shape from the vertex 19a as the center.

In this case, since the uneven distribution of the oil flow rate is suppressed as described above and the inclined surface is in a substantially conical shape that is symmetrical with respect to a central axis passing through the vertex 19a, the distribution of the flow rate of the oil flowing over the inclined surface is substantially uniform in a circumferential direction of the inclined surface. Therefore, the flow rate of oil flowing into a branch path 20a and the flow rate of oil flowing into a branch path 20b having an inside diameter substantially equal to that of the branch path 20a are substantially equal.

In the case where particles of the oil spray generated have a small particle diameter, oil flowing into the branch paths 20a and 20b is in an oil spray form. In the case where particles of the oil spray generated have a relatively large particle diameter, the particles tend to adhere to each other. Therefore, in some cases, they collide with each other on the inclined surface, thereby changing into a droplet state. In this case as well, the flow rate distribution of oil flowing on the inclined surface is substantially uniform in the circumferential direction of the inclined surface, and the flow rate of oil flowing into the branch path 20a and the flow rate of oil flowing into the branch path 20b are equal to each other.

It should be noted that in order to make the oil flow rate distribution uniform surely as described above, inlets of the branch paths 20a and 20b preferably are arranged so that distances between adjacent inlets (distances between centers of the inlets) along the wall surface of the diverting wall 19 in the circumferential direction of the wall surface are substantially equal to each other, as shown in FIG. 2A.

Here, the diverting wall 19 has the inclined surface, and the example shown in FIG. 2A has a recess in a substantially conical shape recessing in a direction through which the droplets flow out of the through hole 18. Therefore, the air space 45 is formed between the diverting wall 19 and an end of the through hole 18, the air space 45 being encircled by the diverting wall 19. The air space 45 has a maximum width (diameter direction) greater than the inside diameter of the through hole 18, a maximum depth greater than an inside diameter of the branch paths 20a and 20b, and hence, has a size sufficient to allow the flow discharged from the through hole 18 to be diffused therein.

For instance, the maximum width of the air space preferably is on the order of four to seven times the inside diameter d of the through hole 18 (in the case where the inside diameter d is 1.5 mm, the maximum with of the air space is 6 mm to 10.5 mm). The inside diameter d is, for instance, about 1 mm to 2 mm. Furthermore, the maximum depth of the space preferably is in a range of 10 mm to 30 mm. According to the size of the space, the degree of diffusion of the oil discharged from the through hole 18 varies, and the distance through which the discharged oil impinges onto the wall varies, and according to the degree of diffusion and the distance for the impingement, the particle diameter of oil particles in the air space varies. Therefore, the air space is not limited to the foregoing numerical values, but may be determined appropriately according to a required flow rate at an outlet at the end.

Figure 2B:
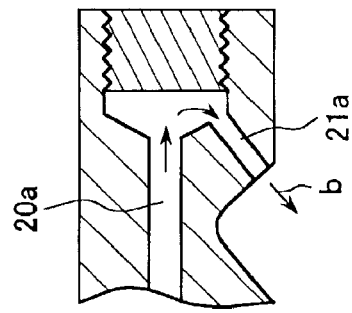
FIG. 2B is a cross-sectional view of a discharging section of the diverting section 2 shown in FIG. 1 taken in a horizontal direction.

As shown in FIGS. 1 and 2B, the transported flow thus diverted into the paths 20a and 20b flows into paths 21a and 21b at end portions, respectively, where it is discharged from each of the outlets in a changed direction (indicated by an arrow b). Thus, by changing the direction through which the flow travels, droplets are applied to both sides of the saw blade 22 in the example shown in FIG. 1.

Furthermore, as described above, the flow rate of oil flowing into the branch path 20a and the flow rate of oil flowing into the branch path 20b are made equal to each other, and this state is maintained at the outlets at the end of the paths also. In other words, according to the present embodiment, it is possible to make respective amounts of oil applied to a plurality of objects substantially uniform, to make the cutting treatment uniform, and to reduce the variations in the processing work, by means of a device of a simple structure, without using a complex and high-cost device, for instance, having a spray generator and a liquid transporting pump for every outlet.

It should be noted that the collar 17 of the cylindrical member having the through hole 18 is formed separately from the joint main body 7 as described above, but they may be provided integrally. In the case where the collar 17 of the cylindrical member is formed separately from the joint main body 7 as in the present embodiment, the collar 17 can be replaced easily with another collar having a through hole 18 with a different inside diameter. Thus, by varying the inside diameter of the through hole 18, it is possible to adjust the particle diameter and the flow velocity of the flow discharged from the through hole 18, thereby adjusting the state of the discharged flow according to the type of the processing object and the degree of the processing. Furthermore, such adjustment of the state of the flow is enabled by the adjustment of the gas flow rate and the oil flow rate, and it is possible to increase or decrease the flow rate at the outlets at the path ends as required.

Embodiment 2

Figure 3A:
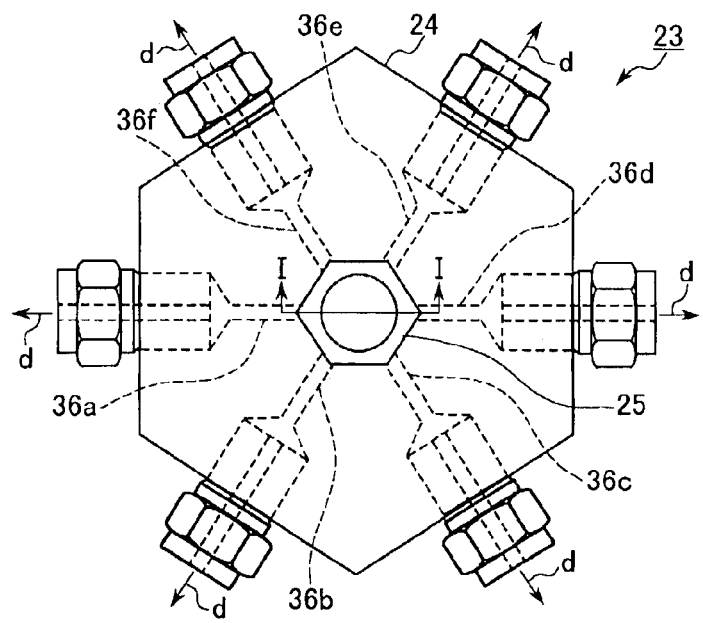
FIG. 3A is a plan view of a piping device according to Embodiment 2 of the present invention.
Figure 3B:
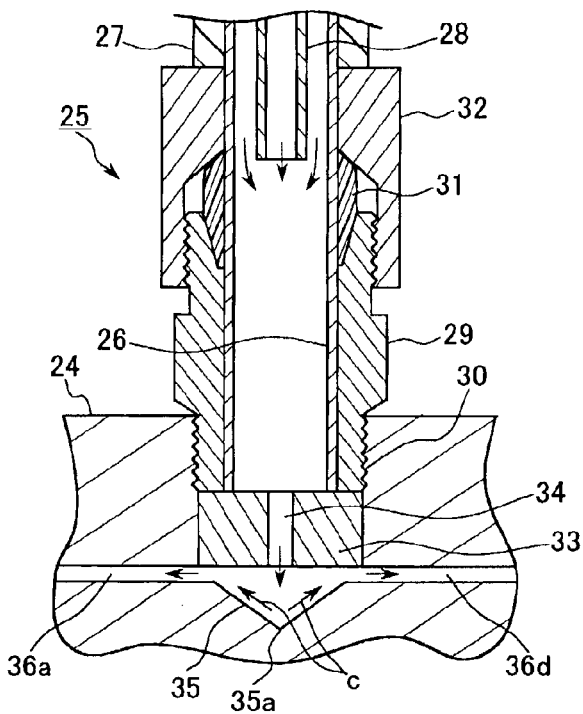
FIG. 3B is a cross-sectional view taken along a line I—I in FIG. 3A.

FIG. 3A is a plan view illustrating a piping device according to Embodiment 2 of the present invention. FIG. 3B is a cross-sectional view of the piping device taken along a line I—I in FIG. 3A. The piping device according to the present embodiment can be used as a piping device for use in a cutting oil coater. In Embodiment 2, the number of branch paths for diversion is increased as compared with Embodiment 1, and the example shown in FIG. 3 is capable of discharging oil in six directions from a diverting section 24.

A piping device 23 includes a diverting section 24 and joints 25. A basic configuration of the joint 25 is identical to that of the example shown in FIG. 2A, and a gas tube 27 is connected to the joint 25 via a pipe 26 serving as an oil supply path, as shown in FIG. 3B. In the gas tube 27, an oil tube 28 is inserted.

A joint main body 29 is fastened to the diverting section 24 via a screw thread 30 thereof. The pipe 26 is inserted through a sleeve 31 as a fixing member. A nut 32 as a fastening member is screwed firmly against a screw thread 30 of the joint main body 29 so that the sleeve 31 is pressed firmly to the pipe 26. Thus, the pipe 26 is fixed to the joint main body 29 via the sleeve 31 and the nut 32.

Furthermore, as in Embodiment 1, the gas tube 27 and the oil tube 28 are connected with a gas source and an oil pump, respectively. Such a configuration and an operation are identical to those in Embodiment 1, and hence, the illustration and detailed description thereof are omitted herein.

Oil in a liquid state discharged from an end of the oil tube 28 and gas discharged from an end of the gas tube 27 are mixed inside the pipe 26, and the oil changes from the liquid state to a droplet state. A collar 33 is inserted into between an end of the joint main body 29 and a diverting wall 35. In the example shown in the drawing, the collar 33 is configured by forming a through hole 34 as a path having a decreased diameter in a cylindrical member.

As in Embodiment 1, the droplets of oil generated in the pipe 26 flow into the through hole 34 in the collar 33, in which the flow velocity increases. The oil flowing at an increased flow velocity is discharged to an air space, changing into an oil spray, and impinges on the diverting wall 35. The diverting wall 35 recesses in a substantially conical shape, in the example shown in the drawing. The droplets impinging on the diverting wall 35 are diverted (in directions indicated by arrows c) from a vertex 35a as the center, and flow into paths 36a to 36f, whereby they are diverted in six directions. In order to make the distribution of the flow rates of oil flowing into the paths 36a to 36f uniform more surely, inlets of the paths 36a to 36f are arranged so that, as shown in FIG. 3A, respective distances between adjacent inlets (distances between the centers of the inlets) on the surface of the diverting wall 35 are substantially uniform.

In the present embodiment as well, the flow rates of oil flowing into the six branch paths 36a to 36f are substantially uniform, like in Embodiment 1, and this state is maintained as to flow rates of the flow discharged from outlets (indicated by arrows d).

Embodiment 3

Figure 4A:
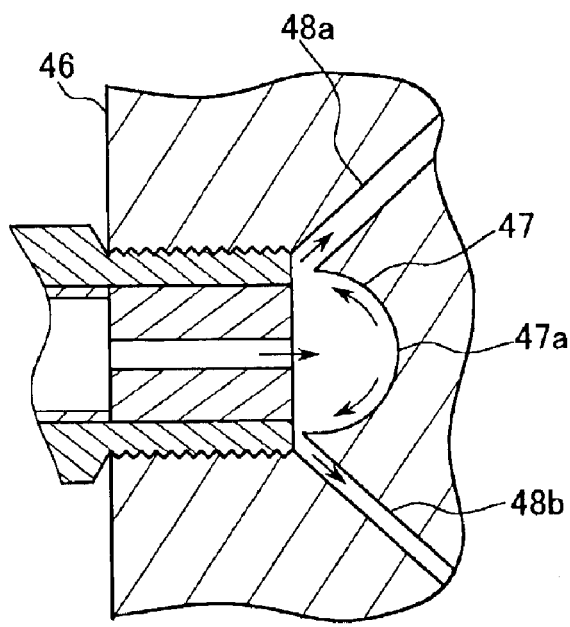
FIG. 4A is a cross-sectional view of an embodiment of the present invention in which a diverting wall is formed in a substantially hemispherical shape.
Figure 4B:
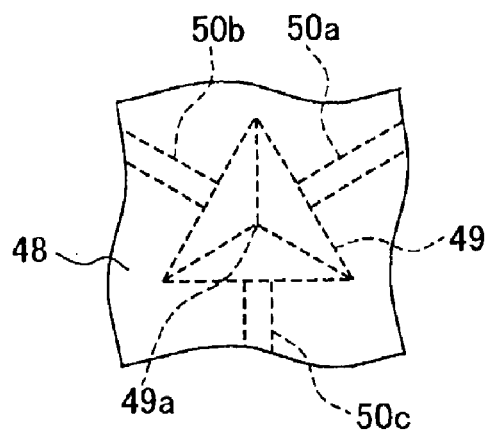
FIG. 4B is a plan view of an embodiment of the present invention in which the wall is formed in a triangular pyramid shape.
Figure 4C:
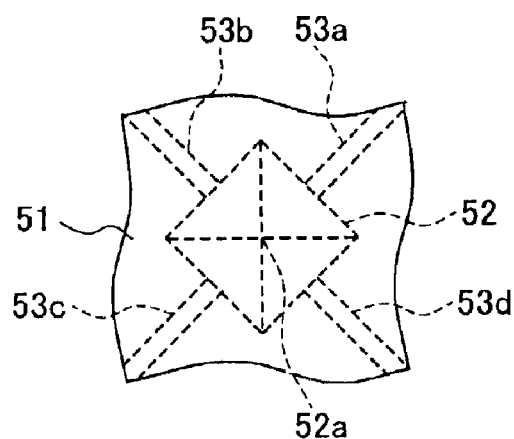
FIG. 4C is a plan view of an embodiment of the present invention in which the wall is formed in a quadrangular pyramid shape.

FIGS. 4A to 4C are views illustrating principal parts of piping devices according to Embodiment 3. FIG. 4A is a cross-sectional view of a joint 46 taken in a horizontal direction thereof (lengthwise direction thereof). The embodiment shown in the drawings is identical to Embodiments 1 and 2 regarding the configuration in which the oil spray impinges on a vertex 47a and the function of the same. While the diverting wall 19 shown in FIG. 2A has a substantially conical recess shape, a diverting wall 47 shown in FIG. 4A according to the present embodiment has a substantially hemispheric shape symmetrical with respect to a central axis passing through a vertex 47a.

As in Embodiments 1 and 2, this causes the oil spray to impinge on the vicinity of the vertex 47a of the diverting wall 47 in a state in which the uneven distribution of the oil flow rate is suppressed, and the distribution of the oil flow rates flowing over a wall surface of the diverting wall 47 is made substantially uniform in a circumferential direction of the wall surface.

In this case, if the branch paths 48a and 48b have a substantially equal inside diameter, the flow rates of oil transported through the branch paths 48a and 48b are substantially equal to each other, as in Embodiments 1 and 2.

In the present embodiment, as shown in FIG. 4A, the branch path 48b has an inside diameter smaller than that of the branch path 48a. This allows the flow rate of the flow discharged from an outlet that is connected to the branch path 48b to be lower than the flow rate of the flow discharged from an outlet that is connected with the branch path 48a. The present embodiment is effective, for example, for drilling using a multi-axis machining tool that includes drills with different diameters.

Here, as described above, the distribution of the oil flow rate on the diverting wall 47 is made substantially uniform in a circumferential direction of the wall. Therefore, in the case where the branch paths 48a and 48b have different inside diameters and the respective flow rates at the outlets are set so as to have a predetermined ratio, the ratio of the flow rates at the outlets is stabilized.

If the flow rate of oil before flowing into the branch paths 48a and 48b varies significantly, the flow rates of the oil transported through the branch paths 48a and 48b are caused to vary from the set ratio, and this causes the ratio of the flow rates of the flows discharged from the outlets to vary significantly from the set ratio.

FIGS. 4B and 4C are plan views, each of which illustrates a part of the diverting section according to the present embodiment. They illustrate principal parts of inside configurations using broken lines. The embodiments shown in FIGS. 4B and 4C have a configuration and a function identical to those of Embodiments 1 and 2 in which the oil spray impinges on the vertexes 49a and 52a, respectively. In each of these embodiments shown in the drawings, the shape of the diverting wall is in a polygonal pyramid shape having the same number of inclined wall surfaces as the number of branch paths, in which the inclined surfaces have areas substantially equal to one another. In the diverting section 48 shown in FIG. 4B, a diverting wall 49 has a recess in a triangular pyramid shape, and oil spray impinging on the vicinity of the vertex 49a is diverted along three inclined surfaces, thereby flowing into the diverting paths 50a to 50c. In the diverting section 51 shown in FIG. 4C, the diverting wall 52 has a recess in a quadrangular pyramid shape, and the oil spray impinging on the vicinity of the vertex 52a is diverted along four inclined surfaces, thereby flowing into branch paths 53a to 53d.

In these embodiments also, oil spray in which uneven distribution of the oil flow rate is suppressed impinges on the vicinity of the vertex. The oil spray impinging on the vicinity of the vertex is diverted along the inclined surfaces substantially equally, whereby the distribution of the flow rates of oil flowing on the respective inclined surfaces is substantially uniform in a circumferential direction of the wall surface. As a result, an identical effect to that in the above-described case of the conical shape or the hemispherical shape is achieved.

Furthermore, in the examples shown in FIGS. 4B and 4C, in order to make the oil flow rates of the branch paths uniform more surely, inlets of the paths are arranged so that respective distances between adjacent inlets (distances between the centers of the inlets) on the surface of the diverting wall are substantially uniform.

It should be noted that the example shown in FIG. 4A has a configuration in which the diverting wall is in a substantially hemispherical shape, but the shape of the diverting wall may be in a hemispheric shape in combination with a cylindrical shape. Furthermore, another shape symmetrical with respect to an axis passing through the vertex may be used. Furthermore, as in the foregoing triangular pyramid shape, the shape does not have to be axially symmetrical, as long as it is a shape in which the oil spray impinging on the wall is diverted substantially equally.

Furthermore, in the example shown in FIG. 4A, an embodiment in which the branch paths have different inside diameters is described, with the case of a hemispherical-shape diverting wall taken as an example, but the diverting wall may be in another shape such as a substantially conical shape.

Embodiment 4

Figure 5A:
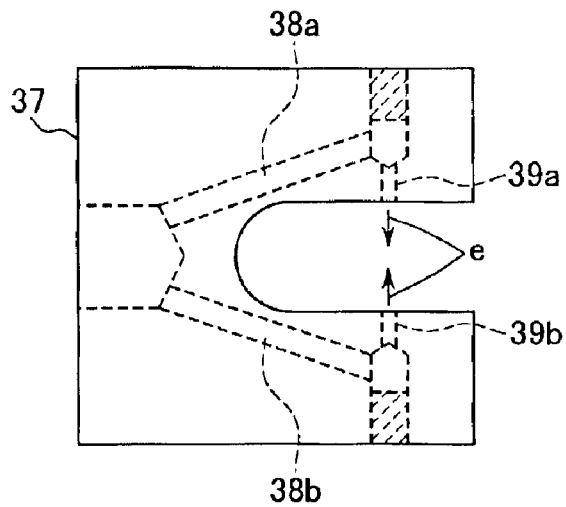
FIG. 5 is a plan view of a piping device with a diverting wall according to another embodiment of the present invention.
Figure 5B:
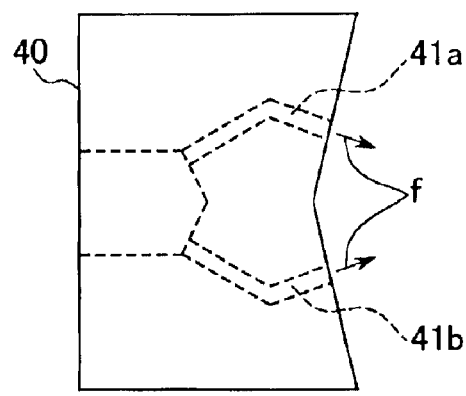
Figure 5C:
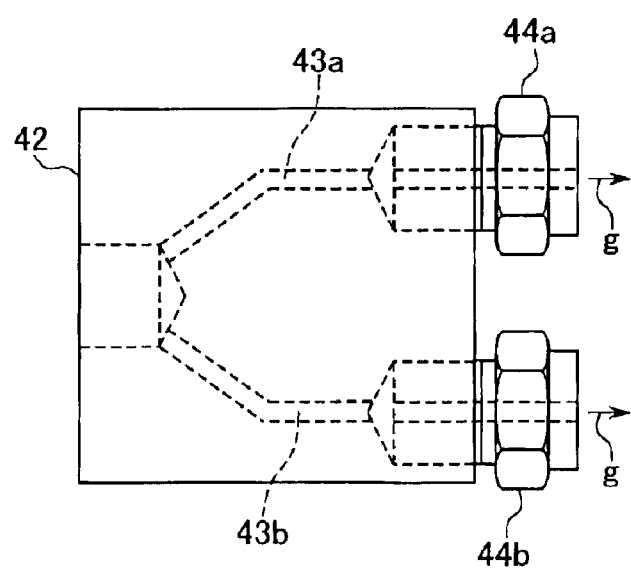
Figure 6:
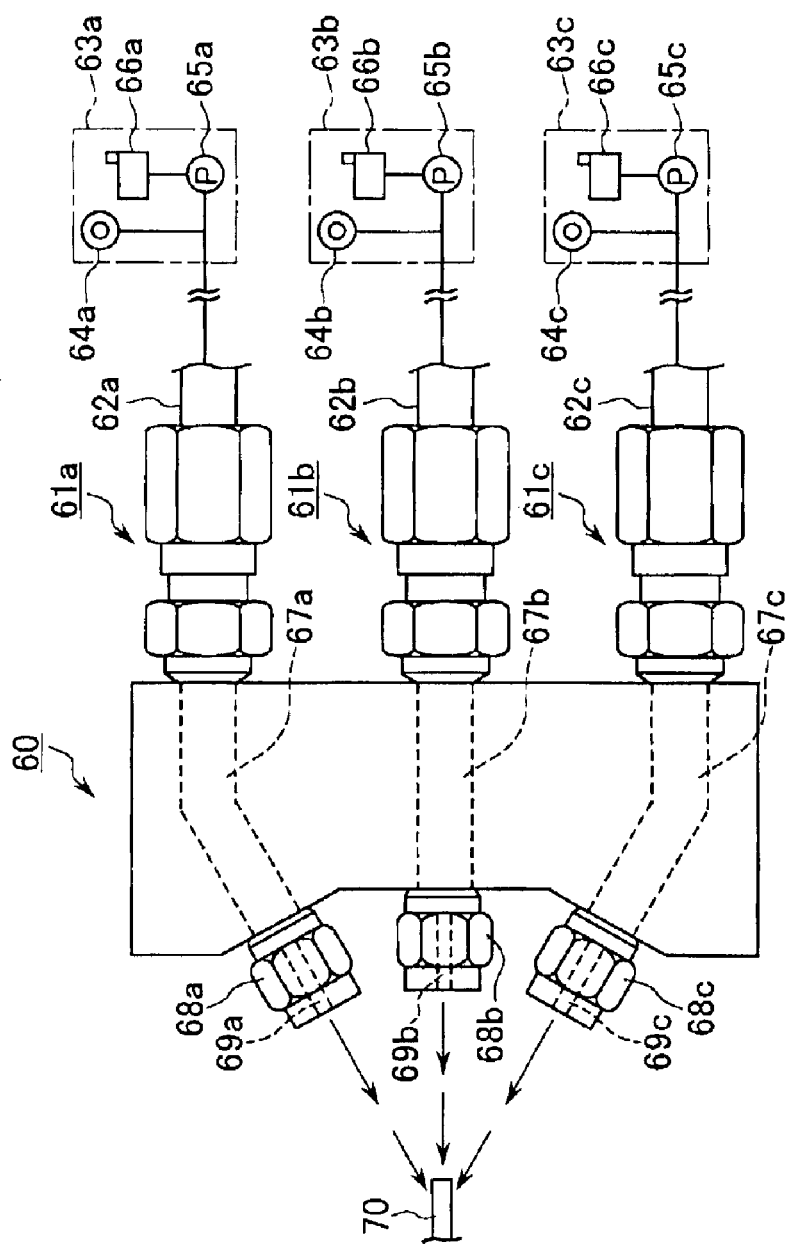
FIG. 6 is a view illustrating a configuration of an example of a conventional cutting oil coater.
Figure 7:
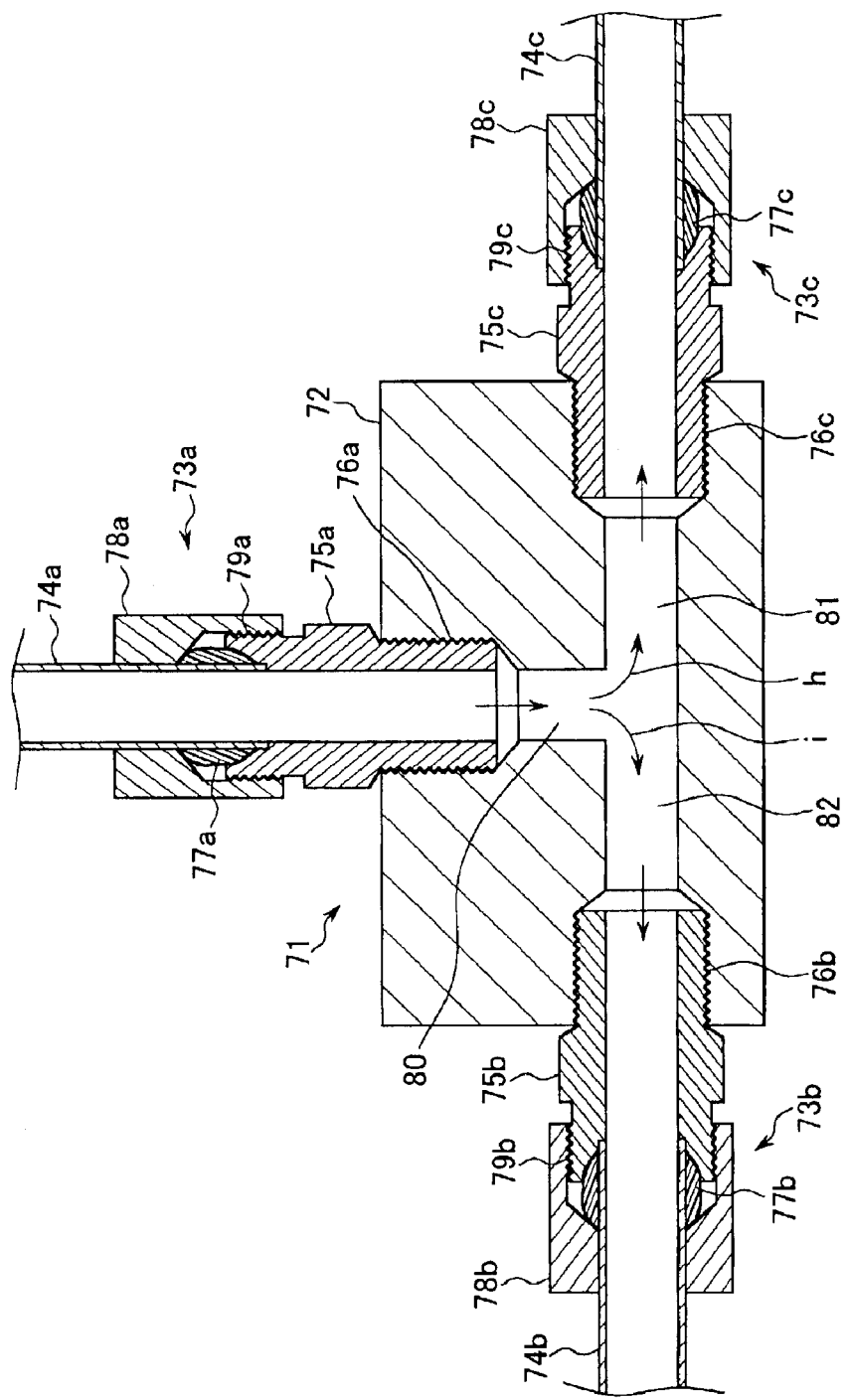
FIG. 7 is a cross-sectional view illustrating another example of a conventional piping device.

FIG. 5 is a plan view illustrating a piping device according to Embodiment 4. The piping device according to the present embodiment may be used as a piping device for use in a cutting oil coater. In FIGS. 5A to 5C, the illustration of a joint section is omitted, since the joint section has a configuration identical to that shown in FIGS. 1, 2A, and 2B. The embodiments shown in the drawings differ from one another in the discharging direction. In a diverting section 37 shown in FIG. 5A, discharge paths 38a and 38b are connected to discharge paths 39a and 39b that are directed so as to face each other. The device of this type is suitable for applying discharged oil (discharged in directions indicated by arrows e) to, for example, both sides of a tool.

In a diverting section 40 shown in FIG. 5B, discharge paths 41a and 41b are arranged so as to form an acute angle. In this case, the device is suitable for applying the discharged flows (discharged in directions indicated by arrows f) to, for example, two separate tools such as two drills, or two sides of a tool such as a saw plate. In a diverting section 42 shown in FIG. 5C, discharge paths 43a and 43b are arranged in parallel with each other. In this case as well, it is possible to apply the discharged flows (discharged in directions indicated by arrows g) to, for example, two separate tools such as drills. FIG. 5C illustrates an example in which outlets 44a and 44b are attached additionally, but the flow may be discharged directly from outlet apertures formed in the diverting section 42.

It should be noted that in the foregoing embodiments, the diameters of the outlets may be decreased so that oil is discharged at increased flow velocities, according to the type of a processing object and a degree of the processing.

Although the foregoing embodiments are directed to the configuration in which the oil discharged from the piping device is applied to a tool such as a drill, a saw blade, etc. that is independent from the piping device, the piping device may be configured so as to be incorporated in the tool. In this configuration, the tool and the piping device are not separated from each other, but the piping device is provided in the tool per se.

For instance, a recess forming a diverting wall and branch paths may be formed inside a tool holder for holding a cutting blade for use in cutting. This configuration allows the branch paths formed inside the tool holder to follow the moving tool holder, that is, to follow the cutting position, thereby having an advantage in enhancing the processing accuracy.

The invention may be embodied in other forms without departing from the spirit or essential characteristics thereof The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A piping device comprising:

an oil supply path;

a narrower path connected with the oil supply path and having an inside diameter smaller than that of the oil supply path;

an air space into which the oil is discharged from the narrower path;

a wall defining the air space having a recess; and a plurality of branch paths into which the oil having impinged on the recess flows, wherein a vertex of the recess and an end of the narrower path face each other; and wherein the recess has a shape of a polygonal pyramid having the same number of inclined surfaces as the number of the branch paths.

2. The piping device according to claim 1, wherein the recess has a shape axially symmetrical with respect to an axis passing through the vertex.

3. A piping device comprising:

an oil supply path;

a narrower path connected with the oil supply path and having an inside diameter smaller than that of the oil supply path;

an air space into which the oil is discharged from the narrower path;

a wall defining the air space having a recess; an a plurality of branch paths into which the oil having impinged on the recess flows, wherein a vertex of the recess and an end of the narrower path face each other; and wherein at least one of the plurality of branch paths has an inside diameter different from an inside diameter of the other paths.

4. The piping device according to claim 1, wherein the narrower path is a through hole of a member formed separately from the oil supply path, and the member is detachable and replaceable.

5. The piping device according to claim 1, wherein the plurality of branch paths are arranged so that respective distances along the wall between adjacent inlets of the branch paths are substantially uniform.

6. A cutting oil coater comprising the piping device according to claim 1.

7. A piping device, for use in a cutting oil coater for coating a cutting oil over cutting objects and tools in a cutting process, comprising:

an oil supply path;

an oil tube, from which oil is discharged in a liquid state from an end of said oil tube;

a gas tube, inserted in said oil tube, and connected to said oil supply path, for discharging a gas through an end of said gas tube;

such that oil discharged from said end of said oil tube and gas discharged from said end of said gas tube are mixed in said oil supply path, wherein said oil is changed from a liquid state to a droplet state;

a narrower path connected with the oil supply path and having an inside diameter smaller than that of the oil supply path;

an air space into which the oil is discharged from the narrower path;

such that a flow velocity of said oil in said droplet state, from said oil supply path, increases as said oil in said droplet state flows into said narrower path, whereupon it diffuses into said air space and is changed into an oil spray;

a wall defining the air space, having a recess; and a plurality of branch paths into which the oil having impinged on the recess flows, wherein a vertex of the recess and an end of the narrower path face each other.

8. The piping device according to claim 7, wherein the recess has a shape axially symmetrical with respect to an axis passing through the vertex.

9. The piping device according to claim 7, wherein the recess has a shape of a polygonal pyramid having the same number of inclined surfaces as the number of the branch paths.

10. The piping device according to claim 7, wherein at least one of the plurality of branch paths has an inside diameter different from an inside diameter of other branch paths.

11. The piping device according to claim 7, wherein the narrower path is a through hole of a member formed separately from the oil supply path, and the member is detachable and replaceable.

12. The piping device according to claim 7, wherein the plurality of branch paths are arranged so that respective distances along the wall between adjacent inlets of the branch paths are substantially uniform.

13. A cutting oil coater comprising the piping device according to claim 7.

14. A piping device comprising:

an oil supply path;

a narrower path connected with the oil supply path and having an inside diameter smaller than that of the oil supply path;

an air space into which the oil is dishcarged from the narrower path;

a wall defining the air space having a recess, in a shape of a polygonal pyramid; and a plurality of branch paths into which the oil having impinged on the recess flows;

wherein a vertex of the recess and an end of the narrower path face each other; and wherein said air space, in the shape of a polygonal pyramid, has a same number of inclined surfaces as a number of the branch paths.

15. The piping device according to claim 14, wherein the recess has a shape axially symmetrical with respect to an axis passing through the vertex.

16. The piping device according to claim 14, wherein at least one of the plurality of branch paths has an inside diameter different from an inside diameter of other branch paths.

17. The piping device according to claim 14, wherein the narrower path is a through hole of a member formed separately from the oil supply path; and the member is detachable and replaceable.

18. The piping device according to claim 14, wherein the plurality of branch paths are arranged so that respective distances along the wall between adjacent inlets of the branch paths are substantially uniform.

19. A cutting oil coater comprising the piping device according to claim 14.

20. The piping device according to claim 3, wherein the recess has a shape axially symmetrical with respect to an axis passing through the vertex.

21. The piping device according to claim 3, wherein the narrower path is a through hole of a member formed separately from the oil supply path, and the member is detachable and replaceable.

22. The piping device according to claim 3, wherein the plurality of branch paths are arranged so the respective distances along the wall between adjacent inlets of the branch paths are substantially uniform.

23. A cutting oil coater comprising the piping device according to claim 3.

* * * * *